UNITED STATES PATENT OFFICE 2,110,499

DEPOLYMERIZATION OF LINEAR POLYACETALS

Wallace H. Carothers, Wilmington, Del., assignor to E. I. du Pont de Nemours & Company, Wilmington, Del., a corporation of Delaware No Drawing. Application January 2, 1935, Serial No. 179. In Canada November 25, 1932

10 Claims.  (Cl. 260—54)

This invention relates to new compositions of matter, and particularly to new cyclic acetals and other products obtained thru the depolymerization of linear polyacetals.

It is to be noted that the word "acetals" is used in chemical literature and also in the description of the present invention in three senses: (1) as a generic expression which represents the compound derived from the carbonyl grouping such as is present in aldehydes and ketones by replacing the carbonyl oxygen with two OR groups (the R of the two OR groups may be one and the same group in which case a cyclic compound is formed); (2) as a subgeneric expression representing the acetals formed from acetaldehyde; (3) as a specific expression to represent the definite chemical individual, diethyl acetal, i. e., the diethyl ether of ethylidine glycol. The compounds wherein the carbonyl oxygen is replaced by one hydroxyl and one OR group are called hemiacetals.

This case is a continuation in part of copending application Serial No. 548,701, filed July 3, 1931.

Cyclic acetals as a broad class are not new. Hill and Hibbert (J. Am. Chem. Soc. 45, 3117, 3124 (1923)) prepared a number of cyclic acetals by reacting polyhydroxy compounds, e. g., ethylene glycol, with either acetylene or acetaldehyde. More recently Hallonquist and Hibbert (Can. J. Research 8, 129 (1933)) prepared a number of cyclic acetals by the interchange method. This method consists in heating the glycol with an open chain monomeric acetal whereupon the lower boiling alcohol distills over, leaving the desired acetal. The compounds prepared by these authors were limited to cyclic acetals containing 5, 6, and 7-membered rings. The method is inapplicable to the preparation of cyclic acetals containing more than 7 members in the ring; in fact, the method gives poor yields when applied to the preparation of the 7-membered rings. When these methods are applied to higher glycols (glycols in which the hydroxyl groups are separated by a chain of at least 5 atoms), linear polyacetals are formed as shown in copending application Serial No. 178, filed of even date herewith.

A cyclic hemiacetal seems to have been prepared in poor yield by Helferich and Schafer (Ber. 57, 1911 (1924)) by treating ω-hydroxynonaldehyde with methanol and hydrogen chloride. The presumable product of this is the methyl lactolide $$\overset{\rule{2cm}{0.4pt}}{\text{OCH}_3\text{(CH}_2\text{)}_7\text{CHOCH}_3}$$

This is a 10-membered ring but contains only one oxygen atom in the ring. It is essentially a methyl ether of a cyclic hemiacetal.

U. S. Patent 1,837,273 discloses the preparation of certain cyclic acetals by heating an aromatic aldehyde with an aliphatic glycol. The patented products do not have the large rings characteristic of those of the present invention.

The above reactions for the formation of cyclic acetals containing 7 or less members in the ring may be represented by the following equations; in which $R^1$ and $R^2$ represent hydrogen or a simple or substituted hydrocarbon radical such as an alkyl, aryl, aralkyl or alicyclic radical, and R represents a hydrocarbon radical such as an alkyl, aryl, aralkyl, or alicyclic radical:

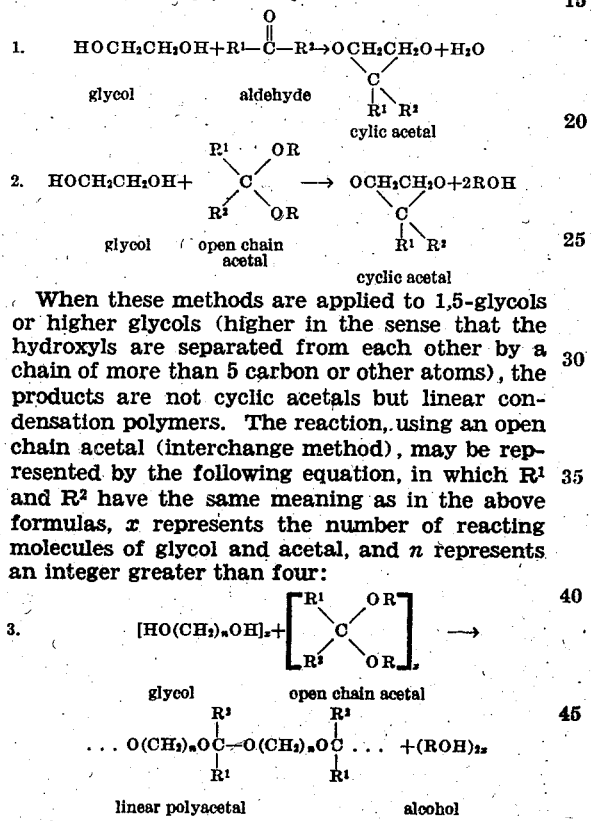

When these methods are applied to 1,5-glycols or higher glycols (higher in the sense that the hydroxyls are separated from each other by a chain of more than 5 carbon or other atoms), the products are not cyclic acetals but linear condensation polymers. The reaction, using an open chain acetal (interchange method), may be represented by the following equation, in which $R^1$ and $R^2$ have the same meaning as in the above formulas, $x$ represents the number of reacting molecules of glycol and acetal, and $n$ represents an integer greater than four:

The reaction follows the same course when an aldehyde is used in place of the open chain acetal but is more difficult to carry out as is disclosed in the copending application Serial No. 178, filed of even date herewith. Even when $n$ is 4, Reaction 3 predominates.

The failure of glycols and acetals (or aldehydes) to give cyclic structures having more than 7 members in the ring appears to be characteristic of all reactions involving bifunctional compounds. Both glycols and acetals (or aldehydes) may be regarded as bifunctional compounds and may react in two ways: Two molecules may condense with the formation of a cyclic compound (Reactions 1 and 2), or many molecules may condense by a chain mechanism to form a linear condensation polymer (Reaction 3). With compounds presenting the possibility of rings of less than 7 members, Reaction 1 or 2 occurs almost exclusively; with compounds capable of giving 7-membered rings, both types of reaction take place, whereas with compounds offering only the possibility of higher membered rings, Reaction 3 occurs practically exclusively.

This invention has as an object the depolymerization of linear polyacetals with the formation of depolymerization products. A further object of the invention is the preparation of cyclic acetals containing at least 8 annular members, at least two of which are oxygen. A further object is the preparation of odoriferous compounds useful in the perfume and analogous arts. A still further object is the polymerization of the monomeric depolymerization products of polyacetals. Other objects will appear hereinafter.

These objects are accomplished by the following invention wherein depolymerization of linear condensation products of acetals to form lower molecular weight depolymerization products including monomeric and dimeric polyacetals having at least 8 annular members of which at least two are oxygen, and hydroxyalkyl vinyl ethers, is carried out by exposing the linear polyacetal to a suitable elevated temperature under a suitable pressure, preferably a reduced pressure.

The process for the depolymerization of suitable linear polyacetals to cyclic acetals of at least 8 ring members, at least two of which are oxygen, is similar to that described by Hill and Carothers (J. Am. Chem. Soc. 55, 5031 (1933)) for the preparation of cyclic esters by the depolymerization of linear polyesters. A suitable method consists in heating the linear polyacetal to a moderately elevated temperature, e. g., 150°–300° C. in a vessel evacuated to a low pressure (less than 2.0 mm. of mercury and preferably less than 0.1 mm.), the vessel being provided with a condenser or cooled surface placed very close (less than 5 cm.) to the surface of the heated acetal. An apparatus of this type is known as a molecular still. Suitable examples of such apparatus are shown in copending application Serial No. 657,408, filed February 18, 1933 which has issued as U. S. Patent 2,020,298 and also at J. Am. Chem. Soc. 54, 1558 (1932). This treating gives a distillate consisting of monomeric and dimeric products and leaves a residue (superpolymer) of higher molecular weight than the original polyacetal. The present invention is concerned with the distillate or depolymerizate, whereas copending application Serial No. 178, which has issued as U. S. 2,071,252 filed of even date herewith, is concerned with the residual superpolymer. The heating is preferably done in the presence of a catalyst such as camphorsulfonic acid. The molecular still is a preferred but not absolutely necessary form of apparatus.

From the foregoing discussion it may be seen that the reaction wherein the macrocyclic acetals (cyclic acetals of at least 8 annular members at least two of which are oxygen), are derived from linear acetals is not a simple depolymerization in the ordinary sense. The reaction consists in depolymerization and polymerization, both changes probably being effected by acetal interchange.

The ease of depolymerization and the relative amounts of distillate and residual superpolymer formed vary greatly with different polyacetals. These differences are indicated in a qualitative way in Table I for the various acetals. It is to be noted that all the polyacetals prepared from tetramethylene glycol, including the formals, isobutyrals, and benzals, are easily depolymerized, giving good yields of monomeric products and smaller amounts of residual superpolymers. The depolymerization does not require the use of a molecular still; simple distillation at atmospheric pressure may be used. The linear polyacetals derived from glycols higher than 1,4 show wide differences in their depolymerization behavior, depending upon the aldehyde or ketone (or monomeric open chain acetal) from which they are derived. Thus, polyformals are depolymerized with considerable difficulty, polybenzals somewhat more readily, and the isobutyrals rather easily. In general, the more easily a polyacetal is decomposed the greater the amount of distillate (depolymerizate), and the smaller the amount of residual superpolymer.

There is also a difference in the nature of the distillate (depolymerizate) obtained from the various linear polyacetals. The distillate derived from polytetramethylene formal and polytriethylene glycol formal are cyclic monomers containing 7 and 11-membered rings, respectively. On the other hand, the depolymerizate obtained from the other polyformals consists largely of the cyclic dimers. The presence of monomers in the depolymerizate is indicated, inter alia, by the odor. The polybenzals yield both cyclic monomers and dimers on depolymerization. The ratio of monomer to dimer differs, depending upon the particular polyacetal and upon experimental conditions. The polyisobutyrals from 1,5 and higher glycols give a monomeric distillate which appears to contain but little cyclic acetal, but to consist largely of a hydroxyalkyl substituted vinyl ether of the general formula $HO(CH_2)_nOCH=C(CH_3)_2$.

The polyacetals derived from acetaldehyde, propionaldehyde, butyraldehyde, and heptaldehyde give monomeric distillates similar to those derived from the polyisobutyrals.

On the basis of the results obtained with the various polyacetals mentioned in the preceding paragraph (complete list in Table I), it may be stated that cyclic acetals (either monomers or dimers) are obtained from the depolymerization of polyacetals in which the aldehyde represented has no replaceable hydrogen on the carbon atom alpha to the carbonyl group, i. e., an aldehyde having no CH group adjacent to the carbonyl group. Formaldehyde and benzaldehyde are representative of this class. Aldehydes having a replaceable hydrogen atom on the alpha carbon such as acetaldehyde, isobutyraldehyde, etc., yield a hydroxyalkyl substituted vinyl ether as the chief component of the depolymerizate. Data on the decomposition are given in Table I.

The physical and analytical data, particularly the molecular weights and molecular refractions given in Tables II and III indicate the depolymerizate of the polyformals and the polybenzals to be the cyclic monomers and dimers. The dimers are odorless, crystalline solids; the monomers possess fragrant odors. The macrocyclic acetals show a tendency to polymerize when heated in the presence of a trace of p-toluenesulfonic acid.

The monomeric depolymerizate obtained from the polyisobutyrals and similar polyacetals are characterized as hydroxy alkyl substituted vinyl ethers

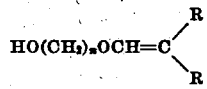

by their ready hydrolysis by dilute acids to the corresponding glycol and aldehyde—a characteristic of vinyl ethers, their reaction with phenylisocyanate, and their polymerization when treated with catalysts of the type used for polymerizing vinyl ethers, the polymerization taking place at room temperature with catalysts such as stannic chloride and iodine. The product obtained from the depolymerization of polyhexamethylene isobutyral gives acetone on oxidation with potassium permanganate in accordance with the unsaturated ether structure. The physical and analytical data and the molecular refractions give further evidence of the unsaturated ether structure.

The monomeric products (both the cyclic acetals and the unsaturated ethers) obtained from the depolymerization of the linear acetals are in general mobile liquids, distillable under vacuum, and having fragrant odors. The cyclic monomer obtained from triethylene glycol formal has a fragrant odor remarkably similar to that of triethylene glycol carbonate. The monomeric products obtained from the linear polymers of tetramethylene formal and isobutyral have strong characteristic odors; that of the latter being reminiscent of camphor, menthol, and eucalyptol.

More complete data concerning the physical properties of the depolymerization products of the linear polyacetals are given in Tables I and II. Analytic data are recorded in Table III.

TABLE I

*Polyacetals and their depolymerization products*

| Polyacetal | Ease of depolymerization | Depolymerizate | | |
|---|---|---|---|---|
| | | Nature | Structure | No. of atoms in ring |
| Tetramethylene formal | Very easy c | Monomer, a liquid | Cyclic | 7 |
| Pentamethylene formal | Difficult | Dimer, M. P. 45–52° C. and monomer | do | 16 |
| Hexamethylene formal | Very difficult | Dimer, M. P. 71–72° C. and trace monomer | do | 18 |
| Nonamethylene formal | do | Dimer, M. P. 68–69° C. and trace monomer | do | 24 |
| Decamethylene formal | do | Dimer, M. P. 93–94° C. and trace monomer | do | 26 |
| Tetradecamethylene formal | do | Dimer, M. P. 103.5–104° C. and trace monomer | do | 34 |
| Octadecamethylene formal | do | b | | |
| Triethylene glycol formal | Easy | Monomer, M. P. 18–20° C. | Cyclic | 11 |
| Hexamethylene acetal | Poor d | Probably monomer liquid | Open chain | |
| Decamethylene acetal | do | | | |
| Hexamethylene propional | Easy | Monomer, liquid | Open chain | |
| Hexamethylene n-butyral | do | do | do | |
| Tetramethylene isobutyral | Very easy c | do | Cyclic | |
| Pentamethylene isobutyral | Easy | do | Open chain | |
| Hexamethylene isobutyral | do | do | do | |
| Nonamethylene isobutyral | do | do | do | |
| Decamethylene isobutyral | do | do | do | |
| Hexamethylene heptal | do | do | do | |
| Hexamethylene ketal | Poor d | | | |
| Tetramethylene benzal | Very easy | Monomer, liquid | Cyclic | 7 |
| Hexamethylene benzal | Difficult | Dimer, M. P. 122–124° C. and monomer | do | 18 |
| Decamethylene benzal | do | Dimer, M. P. 134–135° C. and monomer | do | 26 | a The term "monomer" signifies that the product has the molecular weight and empirical formula of a monomer; it does not necessarily imply that the product has an acetal structure.
b The depolymerizate was not characterized.
c Monomers distilled without the application of vacuum.
d These polymers decomposed to a considerable extent during attempts to depolymerize them.

TABLE II

*Physical properties of depolymerizates of polyacetals*

| Polymer (source) | Nature of product | Probable structure | Ring size | M. P. | B. P. °C./mm. | $n_D^{25}$ | $d_4^{25}$ | $M_r$ Calcd. | $M_r$ Found |
|---|---|---|---|---|---|---|---|---|---|
| Tetramethylene formal | Cyclic monomer | Acetal | 7 | | 112–117° 40– 44°/11 | 1.4310 1.4200 | 1.0022 | 26.38 | 26.34 |
| Pentamethylene formal | do | do | 8 | | | | | | |
| Pentamethylene formal | Cyclic dimer | do | 16 | 45– 52° | | | | | |
| Hexamethylene formal | do | do | 18 | 71– 72° | | | | | |
| Nonamethylene formal | do | do | 24 | 68– 69° | | | | | |
| Decamethylene formal | do | do | 26 | 93– 94° | | | | | |
| Tetradecamethylene formal | do | do | 34 | 103–104° | | | | | |
| Triethylene glycol formal | Cyclic monomer | do | 11 | 18– 20° | | | | | |
| Hexamethylene acetal | Open chain monomer | Ether | | | 45– 54°/0.5 | | | | |
| Hexamethylene propional | do | do | | | 77– 79°/3 | | | | |
| Hexamethylene n-butyral | do | do | | | 85– 86°/3 | 1.4545 | 0.9036 | 51.09 | 51.59 |
| Tetramethylene isobutyral | Cyclic monomer | Acetal | 7 | | 64– 65°/19 | 1.4335 | 0.9323 | 40.23 | 40.18 |
| Pentamethylene isobutyral | Open chain monomer | Ether | | | 132–133°/22 | 1.4560 | 0.9066 | 46.47 | 47.37 |
| Hexamethylene isobutyral | do | do | | | 96.5°/2 | 1.4560 | 0.9016 | 51.09 | 51.59 |
| Nonamethylene isobutyral | do | do | | | 117–122°/1 | 1.4585 | 0.8912 | 64.94 | 65.58 |
| Decamethylene isobutyral | do | do | | | 135/141°/1 | | | | |
| Hexamethylene heptal | do | do | | | 129/135°/1 | | | | |
| Tetramethylene benzal | Cyclic monomer | Acetal | 7 | | 127°/12 | | | | |
| Hexamethylene benzal | Cyclic dimer | do | 18 | 122–124° | | | | | |
| Decamethylene benzal | do | do | 26 | 134–135° | | | | | |

Table III

*Analytical data for depolymerizates of polyacetals*

| Polymer (source) | Nature of product | Probable structure | Ring size | Calculated C | Calculated H | Calculated Mol. wt. | Found C | Found H | Found Mol. wt. |
|---|---|---|---|---|---|---|---|---|---|
| Tetramethylene formal | Cyclic monomer | Acetal | 7 | 58.82 | 9.80 | 102 | 59.55 | 9.99 | 103;100 |
| Pentamethylene formal | ___do___ | ___do___ | 8 | 62.07 | 10.34 | ___ | 61.97 | 10.76 | ___ |
| Pentamethylene formal | Cyclic dimer | ___do___ | 16 | 62.07 | 10.34 | 232 | 61.75 | 10.45 | 263;266 |
| Hexamethylene formal | ___do___ | ___do___ | 18 | 64.6 | 10.8 | 260 | 64.0 | 10.6 | 255;257 |
| Nonamethylene formal | ___do___ | ___do___ | 24 | 69.77 | 11.62 | 344 | 69.75 | 11.58 | 333;334 |
| Decamethylene formal | ___do___ | ___do___ | 26 | 70.9 | 11.9 | 372 | 70.8 | 12.1 | 356;368 |
| Tetradecamethylene formal | ___do___ | ___do___ | 34 | 74.4 | 12.4 | 484 | 74.4 | 12.5 | 503;526 |
| Triethylene glycol formal | Cyclic monomer | ___do___ | 11 | 51.85 | 8.64 | 162 | 51.56 | 8.37 | 161;160 |
| Hexamethylene acetal | Open chain monomer | Ether | ___ | 66.67 | 11.11 | ___ | 67.34 | 10.77 | ___ |
| Hexamethylene propional | ___do___ | ___do___ | ___ | 68.35 | 11.39 | 158 | 68.12 | 11.20 | 445;425* |
| Hexamethylene n-butyral | ___do___ | ___do___ | ___ | 69.76 | 11.62 | 172 | 70.28 | 11.65 | 177;186 |
| Tetramethylene isobutyral | Cyclic monomer | Acetal | 7 | 66.67 | 11.11 | 144 | 66.54 | 11.03 | 144;142 |
| Pentamethylene isobutyral | Open chain monomer | Ether | ___ | 68.35 | 11.39 | ___ | 69.19 | 10.97 | ___ |
| Hexamethylene isobutyral | ___do___ | ___do___ | ___ | 69.76 | 11.62 | 172 | 69.53 | 11.39 | 185 |
| Nonamethylene isobutyral | ___do___ | ___do___ | ___ | 72.90 | 12.15 | 214 | 73.45 | 12.27 | 281;290 |
| Decamethylene isobutyral | ___do___ | ___do___ | ___ | 73.69 | 12.29 | ___ | 74.36 | 11.97 | ___ |
| Hexamethylene heptal | ___do___ | ___do___ | ___ | 72.90 | 12.15 | ___ | 73.80 | 11.88 | ___ |
| Tetramethylene benzal | Cyclic monomer | Acetal | 7 | 74.16 | 7.86 | ___ | 73.34 | 7.72 | ___ |
| Hexamethylene benzal | Cyclic dimer | ___do___ | 18 | 75.72 | 8.74 | ___ | 75.74 | 8.55 | ___ |
| Decamethylene benzal | ___do___ | ___do___ | 26 | 77.86 | 9.92 | ___ | 77.34 | 9.70 | ___ |

*Sample had polymerized some prior to analysis.

Having outlined above the general principles and purposes of the invention, the following examples are given for purposes of illustration, but not in limitation:

Example 1.—Hexamethylene formal

Twenty grams of hexamethylene glycol, 28 g. of dibutyl formal, and a piece of p-toluenesulfonic acid the size of a lentil were heated in a Claisen flask by means of a metal bath. Distillation of butyl alcohol set in at 155° C. The temperature was gradually raised during 1½ hours to 200° C. A current of $CO_2$ was passed thru the melt during the last half hour. The residue was further heated under the vacuum of an oil pump at 200–210° C. for 1½ hours. The product (linear polyacetal) was a viscous brown syrup which did not solidify.

Five grams of the above syrupy polymer was placed in a 250 cc. modified molecular still and heated for 6 hours at 245±5° C. under 2 mm. About 0.2 g. of moist crystalline deposit of a strong minty odor collected on the condenser. This odor was very similar to that of the depolymerizate obtained from hexamethylene carbonate under similar circumstances. The distillate was filtered and the crystalline material recrystallized from 70% methyl alcohol. It crystallized in flat needles of M. P. 71–72° C. and was the cyclic dimer. The residue was superpolymeric in character.

Example 2.—Decamethylene formal

Thirty-four and eight-tenths grams of decamethylene glycol, 36 g. of dibutyl formal did not react alone at 200° C. (bath temperature). When 0.1 g. of $FeCl_3$ was added, ebullition set in at 165° C. The temperature was elevated to 200° C. in three hours. $CO_2$ was passed through the melt the last half hour. Heating was continued under vacuum for 1½ hours at 150°–200° C. Thirty-six and five-tenths cc. of alcohol distilled (theory 37 cc.). The residue (linear polyacetal) solidified on cooling to a light brown wax, weighing 38.5 g. Seventeen and five-tenths grams of the residue was dissolved in 150 cc. of hot ethyl acetate, treated with decolorizing carbon, and allowed to crystallize. The compound separated as a crystalline powder in spherulites and melted at 56.5–57° C. It was dried to constant weight in vacuum at 100° C. and analyzed (C, 68.9; H, 11.7; mol. wt., 2190). It is soluble in chloroform, benzene, carbon tetrachloride, and xylene; insoluble in alcohol, ether, petroleum hydrocarbons and acetone.

Eight grams of the crude material was placed in a 250 cc. modified molecular still and heated at 230–250° C. for 48 hours. The slightly moist distillate (2 g.) had a pleasant, rather camphoraceous odor. After crystallization it melted at 93–94° C. It was the cyclic dimer.

The residue (superpolymer) was tough and leathery and possessed a curious fracture. The fractured surface was white and showed fibrous striations under a lens.

In another experiment 10 g. of the crude linear polymer was placed in a 50 cc. distilling flask and heated under vacuum in a metal bath at 270° C. There was no result until 0.1 g. of $FeCl_3$ was added. In 22 hours, 2.1 g. of distillate (wet dimer) distilled.

Example 3.—Tetradecamethylene formal

Thirteen and two-tenths grams of tetradecamethylene glycol and 10 g. of dibutyl formal were heated together in the usual way with $FeCl_3$ as catalyst. The waxy product (linear polyacetal) was dissolved in hot ethyl acetate and treated with decolorizing carbon. On cooling, the solution deposited the polymer in the form of a microcrystalline powder. It was dried in a vacuum at 100° C. for 20 hours and analyzed (C, 73.1%; H, 12.1%; mol. wt. cryoscopically in benzene, 2480).

Five grams of the crude polymer was placed in a modified molecular still and heated for 30 hours. Three grams of slightly pasty distillate with a rather musky odor collected. Recrystallized from alcohol, it was odorless and melted at 103.5–104° C. It was the cyclic dimer. The residue was superpolymeric in character.

Example 4.—Triethylene glycol formal

Seventy-five grams of triethylene glycol, 84 g. of dibutyl formal, and 0.12 g. of camphorsulfonic acid were heated together by means of a metal bath at 150–190° C. for 2½ hours. Nitrogen was blown thru the mixture the last hour; 89 cc. of butyl alcohol (theory 91 cc.) distilled. The residue (linear polyacetal), a viscous syrup, was heated at 200–250° C. for 3 hours; 57 g. of partially crystalline distillate collected. Most of this was lost by polymerization on attempting to redistil it. The experiment was repeated and a sample purified for analysis, by fractional crystallization. The product melted at 18–20° C. and was the cyclic monomer. It had a mild fragrance much like that of triethylene glycol carbonate. When it was heated for 1 hour at 100° C. with a trace of camphorsulfonic acid it polymerized to a viscous syrup. When boiled with dilute hydrochloric acid it evolved formaldehyde.

Example 5.—Hexamethylene propional

Thirty-four and four-tenths grams of hexamethylene glycol, 59.2 g. of dibutyl propional, and 0.1 g. camphorsulfonic acid were heated together 1½ hours at 150–190° C. with nitrogen blowing the last 40 minutes; 57 cc. of distillate collected. The residue (linear polymer), a somewhat viscous light red liquid, was then heated at 3 mm. and 45.5 g. of distillate boiling at 81–130° C. (mostly at 116° C.; bath at 145–215° C.) was received. The distillate was filtered from 2.5 g. of glycol. The filtrate was dissolved in ether, washed with aqueous sodium carbonate and water, and the residue fractionally distilled at 3 mm.; 11.5 g. came over at 77.5–79° C. It was monomeric in character and its properties indicate it to be the unsaturated ether, $$HOCH_2(CH_2)_4CH_2OCH=CHCH_3.$$

It polymerized to a viscous syrup when heated at 100° C. with a trace of camphorsulfonic acid.

Example 6.—Hexamethylene isobutyral

Seventy and eight-tenths grams of hexamethylene glycol, 127.2 g. of dibutyl isobutyral, and 0.1 g. of pure p-toluenesulfonic acid were heated together at 160–200° C. for 5 hours with blowing with nitrogen during the last ¾ hour; 110 cc. of butyl alcohol distilled (theory 110 cc.). The residue, the linear polyacetal, was a somewhat viscous light orange liquid. A sample was removed, dissolved in ether, washed with aqueous sodium carbonate and water, dried with potassium carbonate, and recovered by evaporation of the ether. After drying it was analyzed. Calcd. for $C_{10}H_{20}O_2$: C, 69.76%; H, 11.62%; mol. wt. 172. Found: C, 68.37%; H, 11.51%; mol. wt. (cryoscopically in benzene) 712; 705.

The remainder was heated at 1 mm. at 150–190° C. and, with the exception of 3 g. of dark, viscous residue, distilled. The distillate was dissolved in ether, washed with sodium carbonate and water, dried, and fractionated. The main fraction, 50 g., distilled at 96.5 C. at 2 mm. There was four grams of residue. The main fraction (monomeric) was the unsaturated ether,

$$HOCH_2(CH_2)_4CH_2OCH=C(CH_3)_2.$$

Example 7.—Nonamethylene isobutyral

Linear polynonamethylene isobutyral was prepared in a manner analogous to that used with hexamethylene isobutyral. On depolymerization, it yielded a monomeric product boiling at 117–122° C./1 mm. Its properties indicate it to have the structure

$$HOCH_2(CH_2)_7CH_2OCH=C(CH_3)_2.$$

It had a viscosity of 0.22 poise (bubble tube) which did not change in one hour's heating at 98–100° C. A trace of p-toluenesulfonic acid was introduced and heating continued one hour at the same temperature. The viscosity of the cooled liquid was 8 poises. Further heating did not change this value.

Example 8.—Hexamethylene heptal

Twenty-nine and five-tenths grams of hexamethylene glycol, 64 grams of dibutyl heptal, and 0.1 gram of camphorsulfonic acid were heated together in the usual way, first at atmospheric pressure, then with blowing, and finally in a vacuum. The theoretical quantity of alcohol distilled during the first two operations and 45 grams of semi-solid distillate of B. P. 120–170° C./1 mm. in the last. The liquid was separated, washed with dilute Na₂CO₃ and dried. It was then distilled at 1 mm. The largest fraction, 9 grams, distilled at 129–135° C. It was yellow and had a very faint pleasant odor. Its properties indicate it to be monomeric in character.

Example 9.—Hexamethylene ketal

Eighteen and eight-tenths grams of dibutyl ketal, 11.8 g. of hexamethylene glycol, and 0.05 g. of camphorsulfonic acid were heated together at 145–170° C. bath temperature for 40 minutes with blowing with nitrogen during the last 5 minutes. Practically the theoretical quantity of butyl alcohol distilled. The syrupy residue (linear polyketal) was then heated at 5 mm. pressure up to 210° C. bath temperature. Twelve and five-tenths g. of yellow distillate, mostly crystalline, distilling at 92–130° C. was collected. The crystalline material, amounting to 9 g., was separated and identified as hexamethylene glycol. The filtrate, which possessed a mild floral fragrance, crystallized partially on standing.

Example 10.—Tetramethylene benzal

Twenty-three and six-tenths g. of tetramethylene glycol, 31.9 g. of dimethyl benzal, and 0.1 g. of camphorsulfonic acid were heated together at 125–140° C. for 30 minutes with blowing with nitrogen during the last 10 minutes. Ninety-four per cent of the theoretical amount of methyl alcohol distilled. The residue was heated under 2 mm. pressure and 41 g. of distillate (B. P. 99–100° C.) was collected. The distillate consisted of two phases and had a strong odor of tetrahydrofurane. It was diluted with ether, washed with dilute Na₂CO₃, dried with K₂CO₃ and recovered by evaporating the ether. Distillation under 12 mm. yielded two main fractions of 10 g. each with boiling points of 123–127° C./12 mm. and 127–127.5° C./12 mm. The second was analyzed and was found to be the cyclic monomer. It had a pleasant odor, reminiscent of benzaldehyde.

Example 11.—Hexamethylene benzal

Thirty-seven and seven-tenths g. of hexamethylene glycol, 50 g. of dimethyl benzal, and 0.1 g. of camphorsulfonic acid were heated together in the usual way for 30 minutes at 115–160° C. with blowing with nitrogen at the end. (The dimethyl benzal was prepared according to Voss (Ann. 485, 283 (1931) from dimethyl sulfite, benzaldehyde, and methyl alcohol.) Methyl alcohol distilled (86% of theory). The residue (linear polyacetal) was heated under 2 mm. for one hour at 170–220° C. Very little distilled. The residual polymeric product consisted of 62 g. of a light yellow, very viscous syrup of faint benzaldehyde odor.

Nine g. of polymer were placed in a small molecular still heated by the vapors of alpha-chlorodiphenyl, B. P. 268° C. and heated for 7 hours under 0.5 mm. Five and five-tenths g. of semi-solid distillate collected. The solid phase was filtered and, after two crystallizations from alcohol, gave needles which melted at 122–124° C. It was the cyclic dimer.

The filtrate was dissolved in ether, washed with dilute $Na_2CO_3$ and dilute $NaHSO_3$, dried over $K_2CO_3$, and recovered by distillation of the ether. It was then put in a small modified molecular still fitted with a drip cup and heated one hour up to 90° C. maximum. Five drops of distillate collected. It was a mobile liquid with a pleasant odor resembling benzaldehyde and was the cyclic monomer. Anal. Calcd. for $C_{13}H_{18}O_2$: C, 75.72%; H, 8.74%. Found: C, 75.80%; H, 9.16%.

The residue increased in viscosity during the distillation and finally resembled the original polymer. Anal. Calcd. for $(C_{13}H_{18}O_2)_n$: C, 75.72%; H, 8.74%. Found: C, 73.78%; H, 8.73%.

*Example 12.—Decamethylene benzal*

Twenty-six grams of decamethylene glycol, 24 g. dimethyl benzal, and 0.06 g. of camphorsulfonic acid were heated together as in the previous preparation. Eighty-three per cent of the theoretical amount of methyl alcohol distilled. The product, obtained in almost theoretical yield, was a pale yellow, very viscous syrup with little odor.

Nine and five-tenths grams was heated for 12 hours at 230–240° C. in a modified molecular still fitted with a drip cup. About 7 cc. distilled. Two-tenths gram of a solid phase was removed and recrystallized from alcohol. It separated as needles and melted at 134–135° C. It was the cyclic dimer.

The liquid distillate was diluted with benzene washed with dilute $NaHSO_3$ and $Na_2CO_3$, dried with $K_2CO_3$ and recovered by distilling the solvent at low temperature. Distillation was carried out in a flat type Hickman molecular still at 0.5 mm. up to 100° C. bath temperature. About 1 cc. came over before the liquid residue, originally quite mobile, became very viscous and distillation ceased. The distillate had a mild pleasant odor, not unlike benzaldehyde. The ready polymerizability of the residue and the analysis of the distillate indicate it to be impure monomer. Anal. Calcd. for $C_{17}H_{26}O_2$: C, 77.86%; H, 9.92%. Found: C, 75.59%; H, 12.06%.

The monomeric depolymerization products of linear polyacetals, which linear polyacetals have a unit length of at least eight atoms, may be polymerized by heating, preferably in the presence of a polymerization catalyst such as camphorsulfonic acid. The following example indicates the polymerization of the monomeric depolymerization products of linear polyacetals of unit length of at least 8. Depolymerization products of polyacetals of unit length less than 8 are included for purposes of comparison:

*Example 13.—Polymerization of monomeric depolymerization products of linear polyacetals*

Samples of the various compounds (monomeric depolymerization products) listed below, including for comparison a few simple cyclic acetals prepared by the usual method (glycol plus aldehyde) were sealed in tubes (5.5 mm. inside diameter) to a depth of 6.5 cm. with a 4.5 cm. air space above the surface. The tubes in which the formals were polymerized were 4 mm. in diameter (inside) filled to a depth of 6 cm. with a 3.5 cm. air space above the liquid. Two tubes were made of every compound, one to be kept pure as a blank, the other catalyzed by the addition of a thin flake of camphorsulfonic acid about 1 mm. square. The times of flow of the liquids on inversion of the tubes were measured at the outset and at the end of each period of heating. The tubes were always allowed to stand at 25° C. for several hours before the measurements were made. The catalyzed samples were heated with results as follows:

*Ethylene isobutyral* (cyclic acetal with 5-membered ring).—1.4 sec. at start; no change after 11¾ hours at 100° C. and then 3 hours at 150° C.

*Trimethylene isobutyral* (cyclic acetal with 6-membered ring).—1.4 sec. at start; no change after 11¾ hours at 100° C. and then 3 hours at 150° C.

*Tetramethylene isobutyral* (a cyclic acetal with 7-membered ring, derived from depolymerization of polytetramethylene isobutyral).—1.4 sec. at start; slightly more viscous after 2¾ hour; 3 sec. after 5¾ hours; 5 sec. after 8¾ hours; 12.5 sec. after 11¾ hours at 100° C. and 1 hour at 150° C.; 12.0 sec. after 11¾ hours at 100° C. and 3 hours at 150° C.

*Monomeric depolymerization product of polypentamethylene isobutyral*

$$(HO(CH_2)_5OCH=C(CH_3)_2).—$$

2.2 sec. at start; 5.0 sec. after 1 hour at 100° C.; 35 sec. after 2 hours at 100° C.; 1 min. 25 sec. after 4 hours at 100° C.; 1 min. 21 sec. after 8 hours at 100° C.

*Monomeric depolymerization product of polyhexamethylene isobutyral*

$$(HO(CH_2)_6OCH=C(CH_3)_2).—$$

2.0 sec. at start; 26 sec. after 15 min. at 100° C.; 50 sec. after 2¾ hours at 100° C.; 2 min. 30 sec. after 8¾ hours at 100° C.; 8 min. 45 sec. after 13¾ hours at 100° C.; almost immobile after 17¾ hours at 100° C.

*Monomeric depolymerization product of polynonamethylene isobutyral.*—See Example 7.

*Trimethylene formal* (cyclic acetal with 6-membered ring).—4.5 sec. at start; no change after 2 hours at 100° C. and then 1½ hours at 150° C.

*Tetramethylene formal* (cyclic acetal with 7-membered ring).—4.5 sec. at start; no change after 2 hours at 100° C.; 35 sec. after 2 hours at 100° C. and 30 min. at 150° C.; almost immobile after 2 hours at 100° C., and 1½ hours at 150° C.

*Pentamethylene formal* (cyclic acetal with 8-membered ring).—4.5 sec. at start; 13 sec. after 2 hours at 100° C.; 16 sec. after 2 hours at 100° C., and 30 min. at 150° C.; 16 sec. after 2 hours at 100° C., and 1½ hours at 150° C.

*Tetramethylene benzal* (cyclic acetal with 7-membered ring).—4.5 sec. start; 30 sec. after 15 min. at room temperature; 100 sec. after 4 hours at room temperature; did not increase on further standing.

It is to be noted that cyclic acetals containing seven or higher membered rings underwent polymerization. All the unsaturated ethers examined polymerized readily.

The depolymerization of the linear polyacetals is not limited to the use of the polyacetals cited in the foregoing tables and examples. Polyacetals may be derived from other glycols, for example, diethylene glycol, heptamethylene glycol, dipropylene glycol, octamethylene glycol, alpha-methylpentamethylene glycol, octadecamethylene glycol, dodecamethylene glycol, tridecamethylene glycol, 1,3-xylylene alcohol, 1,4-xylylene alcohol, etc. The aldehydes (or ketones) represented in the polyacetals are not restricted to those present in the polyacetals mentioned in the examples. As examples of other aldehydes and ketones which may be used, the following are mentioned: propionaldehyde, phenylacetaldehyde, trimethylacetaldehyde, anisic aldehyde, methyl ethyl ketone, cyclohexanone, acetophenone, etc. The cyclic acetals derived from the 1-5 glycols or higher are as a class new products not obtainable by methods heretofore employed.

The new cyclic acetals of the present invention may be represented by the formula

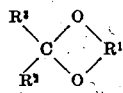

wherein $R^2$ and $R^3$ are hydrogen or monovalent tertiary hydrocarbon radicals and $R^1$ is a divalent organic radical, and preferably a divalent hydrocarbon, having at least 5 annular atoms between the two oxygen atoms.

Ferric chloride, p-toluenesulfonic acid, and camphorsulfonic acid have been mentioned as catalysts for the preparation and depolymerization of the polyacetals. Other halides, e. g., stannic chloride, antimony chloride, aluminum chloride, boron trifluoride, and hydrogen chloride itself may be employed as well as other sulfonic acids, such as benzenesulfonic acid, xylenesulfonic acid, etc. Acidic compounds in general function as catalysts. Thus, magnesium sulfate and potassium acid sulfate are useful. It is desirable however, to select a catalyst which is mild in its action and does not cause excessive darkening or decomposition. The sulfonic acids are particularly suitable. With an acetal of acidic properties, such as a chloro acetal, it is often unnecessary to add a catalyst in the preparation of the polyacetal. In the depolymerization of the polyacetal, a catalyst is likewise often unnecessary.

The conditions for the depolymerization of the linear polyacetals may be varied. While the use of a molecular still for this transformation is in many cases preferable, an inert gas or organic vapor may be passed thru the molten linear polymer with or without the use of reduced pressure to carry away the volatile products. The reaction may also be carried out in a solvent with or without the addition of catalysts with arrangements for distilling and returning the solvent after separating the volatile products of the reaction distilling with it. In certain cases the process may be effected by using powerfully adsorbent materials, such as silica gel, adsorbent carbon, activated alumina, etc., to bring about the irreversible adsorption of the volatile reaction products. The reaction may be carried out at a temperature high enough to make the rate of reaction appreciable but low enough to avoid any thermal decomposition. The use of temperatures over 300° C. is not advisable. In many cases the linear polyacetals can be depolymerized by conventional distillation methods; this is true for the polyisobutyrals mentioned in Table I. The depolymerization of certain polyacetals may start at temperatures as low as 90° C.

The cyclic monomers may be polymerized under varying conditions. Polymerization may be carried out between 75 and 200° C. for extended periods. Catalysts such as camphorsulfonic, benzenesulfonic, p-toluenesulfonic, and other sulfonic acids, aluminum chloride, stannic chloride are of advantage. The polymerization may also be carried out in solution altho in general more slowly. Interpolymerization with other heat polymerizable materials may be effective. The polymers may be used in coating, impregnating, adhesive, etc., compositions.

The open chain monomers may be polymerized at temperatures ranging from room temperature (circa 25° C.) up to approximately 200° C. Peroxides, stannic chloride, aluminum chloride, iodine, etc., catalyze the reaction which may also be carried out in solution in ordinary solvents. Interpolymerization with vinyl esters, methacrylic esters, unsaturated ketones, etc., may be effected. The polymers may be used in coating, impregnating, adhesive, etc., compositions.

The process of the present invention affords a method for the synthesis of macrocylic acetals which cannot be prepared by any other method thus far developed. These compounds generally have fragrant odors rendering them useful in the preparation of perfumes. Through the selection of the proper polyacetal, the process of the present invention affords a method for synthesizing hydroxyalkyl substituted vinyl ethers. The substituted vinyl ethers are formed in a liquid phase reaction which is simpler than the vapor phase reaction for the preparation of substituted vinyl ethers from linear monomeric acetals as described in the literature. The vinyl ethers may be converted into resins useful as adhesives, impregnating agents, and in coating compositions and plastics.

Where the statement is made with respect to an atom A that it is "alpha" to another atom B, it is meant that A and B are directly joined to each other. Where the atom A is "beta" to B it is attached directly to an atom which is in turn attached directly to B.

The above description and examples are intended to be illustrative only. Any modification of or variation therefrom which conforms to the spirit of the invention is intended to be included within the scope of the claims.

I claim:
1. A dimeric cyclic acetal of a glycol having a chain of five to eighteen atoms between the hydroxyls, with an aldehyde of the formula $R^2CHO$, wherein $R^2$ is selected from the class consisting of hydrogen and monovalent hydrocarbon radicals wherein the carbon attached to the carbonyl (CO) group is attached only to carbon atoms.
2. Cyclic triethylene glycol formal.
3. A cyclic acetal of the formula

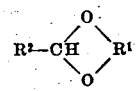

wherein $R^2$ is selected from the class consisting of hydrogen and monovalent hydrocarbon radicals wherein the carbon attached to the acetal

grouping is attached only to carbon atoms and R¹ is a divalent organic radical having a chain of five to eighteen atoms between the acetal oxygens.

4. A cyclic acetal of the formula

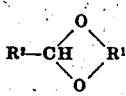

wherein each atom in the beta position to the acetal

carbon is carbon, R² is selected from the class consisting of hydrogen and monovalent hydrocarbon radicals and R¹ is a divalent organic radical having a chain of five to eighteen atoms between the acetal oxygens and is selected from the class consisting of divalent open chain hydrocarbon radicals, xylylene radicals, and divalent radicals consisting of a plurality of divalent open chain hydrocarbon radicals joined through ether oxygen.

5. Cyclic benzals of the formula

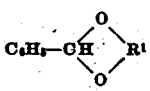

wherein R¹ is a divalent organic radical having a chain of five to eighteen atoms between the acetal oxygens.

6. Cyclic benzals of the formula

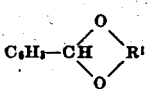

wherein R¹ is a divalent organic radical having a chain of 5 to 18 atoms between the acetal oxygens and is selected from the class consisting of divalent open chain hydrocarbon radicals, xylylene radicals and divalent open chain radicals consisting of a plurality of divalent open chain hydrocarbon radicals joined through ether oxygen.

7. Cyclic formals of the formula

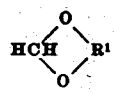

wherein each atom in the beta position to the acetal

carbon is carbon, R² is selected from the class consisting of hydrogen and monovalent hydrocarbon radicals and R¹ is a divalent organic radical having a chain of five to eighteen atoms between the acetal oxygens and is selected from the class consisting of divalent open chain hydrocarbon radicals, xylylene radicals, and divalent radicals consisting of a plurality of divalent open chain hydrocarbon radicals joined through ether oxygen.

8. Cyclic formals of the formula

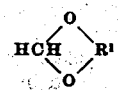

wherein R¹ is a divalent open chain radical consisting of a plurality of divalent open chain hydrocarbon radicals joined through ether oxygen.

9. Process for the preparation of cyclic acetals of the formula

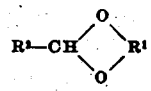

wherein each atom beta to the acetal

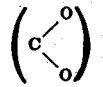

carbon is carbon, R² is selected from the class consisting of hydrogen and monovalent hydrocarbon radicals and R¹ is a divalent organic radical having a chain of five to eighteen atoms between the acetal oxygens, which comprises depolymerizing the corresponding linear polyacetal by heating the same at low pressure and isolating and purifying the depolymerization product.

10. The process of claim 9 wherein a sulfonic acid catalyst is used.

WALLACE H. CAROTHERS.